(12) United States Patent
Kojima (10) Patent No.: US 7,234,296 B2
(45) Date of Patent: Jun. 26, 2007

(54) EXHAUST GAS CLEANUP APPARATUS

(75) Inventor: Masaaki Kojima, Gifu-ken (JP)

(73) Assignee: Ibiden Co., Ltd., Gifu (JP)

( * ) Notice: Subject to any disclaimer, the term of this patent is extended or adjusted under 35 U.S.C. 154(b) by 249 days.

(21) Appl. No.: 10/296,027

(22) PCT Filed: Mar. 20, 2002

(86) PCT No.: PCT/JP02/02675

§ 371 (c)(1),
(2), (4) Date: Nov. 19, 2002

(87) PCT Pub. No.: WO02/077424

PCT Pub. Date: Oct. 3, 2002

(65) Prior Publication Data

US 2004/0031264 A1    Feb. 19, 2004

(30) Foreign Application Priority Data

Mar. 22, 2001    (JP) ............................... 2001-83350

(51) Int. Cl.
*F01N 3/00*    (2006.01)
(52) U.S. Cl. .................... 60/311; 60/297; 55/DIG. 30
(58) Field of Classification Search ................. 60/297, 60/311; 55/DIG. 30, 495, 503, 523
See application file for complete search history.

(56) References Cited

U.S. PATENT DOCUMENTS

| | | | | |
|---|---|---|---|---|
| 3,779,013 A | * | 12/1973 | Faber et al. .................. | 60/278 |
| 5,388,400 A | * | 2/1995 | Hoppenstedt et al. ......... | 60/274 |
| 5,758,496 A | * | 6/1998 | Rao et al. ..................... | 60/295 |
| 5,912,370 A | | 6/1999 | McConkey ................ | 55/385.3 |

FOREIGN PATENT DOCUMENTS

| | | |
|---|---|---|
| DE | 9312405 | 12/1993 |
| JP | 08246861 | 9/1966 |
| JP | 59029721 | 2/1984 |
| JP | 62188514 | 12/1987 |
| JP | 03064611 | 3/1991 |
| JP | 493712 | 8/1992 |
| WO | 9218226 | 10/1992 |
| WO | 9840610 | 9/1998 |

* cited by examiner

*Primary Examiner*—Thomas Denion
*Assistant Examiner*—Diem Tran
(74) *Attorney, Agent, or Firm*—Sawyer Law Group LLP (57) ABSTRACT

An exhaust gas purifier filters exhaust gas of an internal combustion engine to collect particulates in the exhaust gas. The exhaust gas purifier includes an outer casing and an inner casing, which is located in the outer casing and accommodates a filter. The inner casing is selectively attached to and detached from the outer casing.

13 Claims, 11 Drawing Sheets

EXHAUST GAS CLEANUP APPARATUS

BACKGROUND OF THE INVENTION

The present invention relates to an exhaust gas purifier that filters exhaust gas to collect particulates in the exhaust gas.

The number of automobiles has significantly increased and the amount of exhaust gas emitted from internal combustion engines of automobiles is rapidly increasing proportionately. Particularly, exhaust gas emitted from a diesel engine includes substances that cause pollution. The pollution of exhaust gas seriously affects the world environment. Also, it is recently reported that particulates, such as soot, in exhaust gas sometimes become the cause of allergic reaction and declining sperm counts. That is, it is an urgent issue for the human to take measures to remove particulates in exhaust gas.

Figure 11:
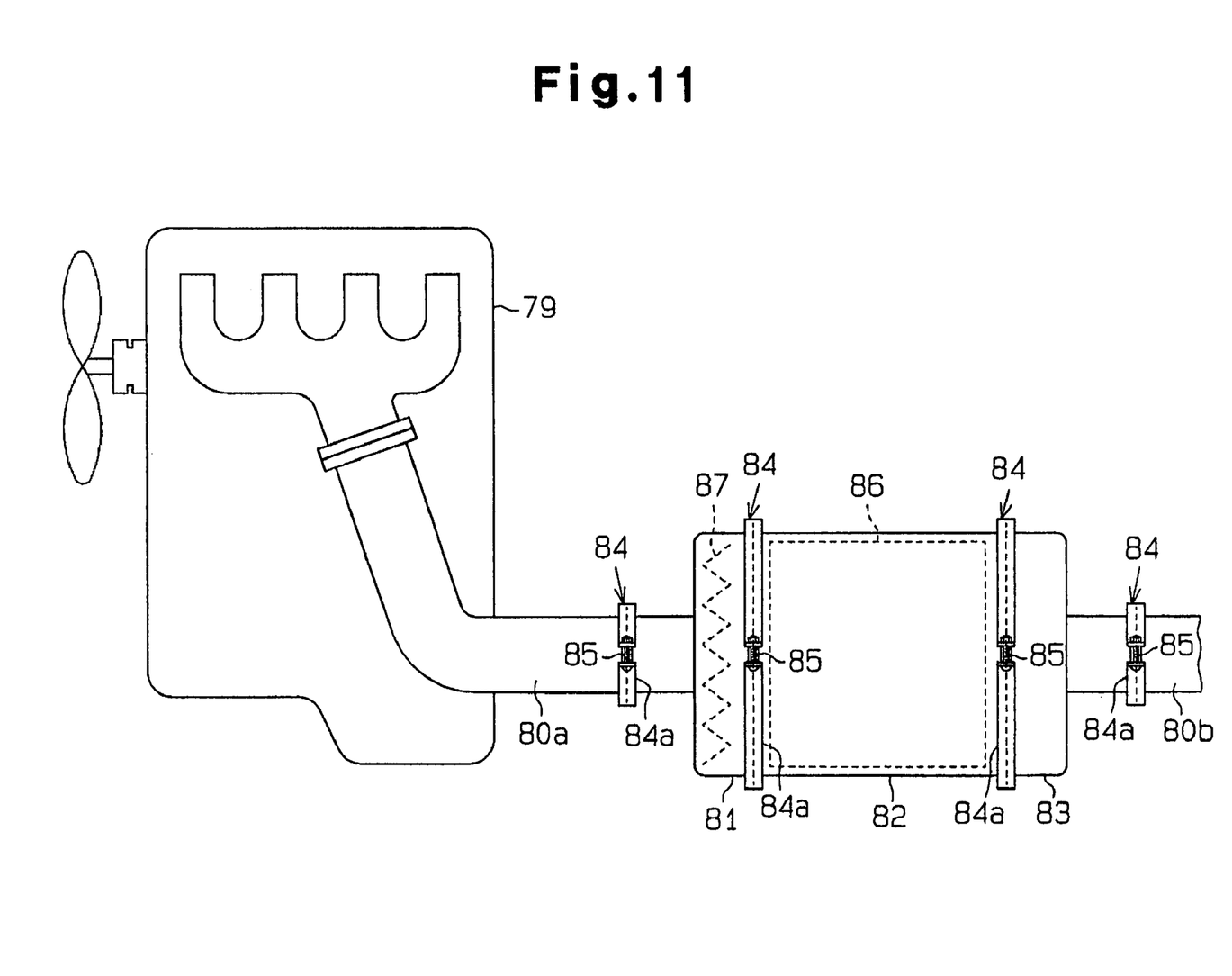
FIG. 11 is a schematic explanatory view illustrating a prior art exhaust gas purifier.

Several types of exhaust gas purifiers are proposed under such circumstances. As shown in FIG. 11, typical exhaust gas purifier includes exhaust pipes 80a, 80b extending from a diesel engine 79. An inlet unit 81, a filter unit 82, and an outlet unit 83 are arranged on the exhaust pipes 80a, 80b in this order from the upstream toward the downstream. The inlet unit 81, the filter unit 82, and the outlet unit 83 are secured with each other with clip bands 84. The upstream exhaust pipe 80a and the inlet unit 81, and the downstream exhaust pipe 80b and the outlet unit 83 are coupled with clip bands 84, respectively. Each clip band 84 is formed of a C-shaped ring 84a, and a screw 85 is tightened at its separate portion. Each screw 85 tightens the corresponding clip band 84, which securely couples the inlet unit 81, the filter unit 82, and the outlet unit 83 with one another.

The filter unit 82 accommodates a honey comb filter 86 for collecting particulates exhausted from the diesel engine 79. The filter 86 has through holes defined by cell walls arranged in grid-like pattern. Either end of each through hole is sealed with sealing material to form a checkered pattern. When exhaust gas passes through the filter 86, particulates are trapped by the cell walls.

If an automobile is driven for a long period with the filter 86 mounted on the automobile, particulates, such as soot, accumulate on the filter 86, which increases the load on the diesel engine 79. To solve this problem, particulates accumulated on the filter 86 need to be removed.

To remove the particulates, the filter unit 82 is removed from the inlet unit 81 and an outlet unit 83. Then, the filter 86 is heated by, for example, a heater, to remove the accumulated particulates. The filter unit 82 of vehicles such as buses needs to be frequently (once a day) removed from the vehicle to regenerate the filter 86 since large amount of particulates are accumulated.

However, in the conventional exhaust gas purifier, an operator needs to loosen the screws 85 and remove the clip bands 84 to remove the filter unit 82, which is burdensome. Further, the filter unit 82 of a heavy vehicle, such as commercial busses, is heavy. Thus, attaching and detaching the filter unit 82 in the above mentioned method is very troublesome. Also, when the vehicle is driven for a long period, the filter unit 82 becomes very hot. Thus, the filter unit 82 needs to be sufficiently cooled down before removing it from the vehicle. This further increases time required for removing the filter.

Further, most vehicles such as buses are not equipped with exhaust gas purifiers. Thus, it may be proposed that an exhaust gas purifier be mounted on an existing bus that has no exhaust gas purifier. However, heavy vehicles such as buses that have large engine displacement have large amount of particulates in exhaust gas. Thus, it is required to mount large exhaust gas purifiers on heavy vehicles. Therefore, it is difficult to prepare a space for placing an exhaust gas purifier.

Accordingly, it is an objective of the present invention to provide an exhaust gas purifier that allows a filter to be easily attached or detached. Another objective is to provide an inexpensive exhaust gas purifier for a bus that is easily mounted on a bus without taking additional space for placing the exhaust gas purifier.

DISCLOSURE OF THE INVENTION

To solve the above problems, a preferred embodiment of the present invention provides an exhaust gas purifier that filters exhaust gas of an internal combustion engine to collect particulates in the exhaust gas. The exhaust gas purifier includes an outer casing and an inner casing, which is located in the outer casing and accommodates a filter. The inner casing is selectively attached to and detached from the outer casing.

Therefore, by removing the inner casing from the outer casing, the filter is removed from the exhaust gas purifier. The filter is attached to the exhaust gas purifier by attaching the inner casing to the outer casing. The filter that has collected particulates is easily exchanged with a regenerated filter.

The outer casing is preferably connected to a downstream end of an exhaust gas passage, which extends from the internal combustion engine. It is because when the exhaust gas purifier is retrofit onto an existing vehicle, the connecting portion between the exhaust gas passage and the exhaust gas purifier is decreased as compared to a case when the exhaust gas purifier is connected to the middle of the exhaust gas passage. This reduces the cost required for mounting the exhaust gas purifier on a vehicle.

A space is preferably formed between the outer casing and the inner casing. In this case, the heat of the filter that is heated as the vehicle travels is prevented from being transmitted to the outer casing via the inner casing. That is, the heat insulation effect of the air is obtained. Thus, expensive tools having heat resistance are not required although tools, which retain the inner casing to the outer casing, are located on the outer circumferential surface of the outer casing. As a result, the manufacturing cost for the exhaust gas purifier is prevented from increasing. Also, noise is prevented from leaking outside the outer casing. This is because sound energy is absorbed in the outer casing.

The outer and inner casings are cylindrical. The outer casing has an opening portion at the downstream end. The inner casing is movable along the axis of the outer casing and is selectively inserted in and removed from the outer casing through the opening portion of the outer casing. In this case, the inner casing is moved along the axis of the outer casing to selectively attach the inner casing to and detach the inner casing from the outer casing. This facilitates the attaching and detaching of the filter. When attaching or detaching the inner casing, the outer casing guides the inner casing. This further facilitates inserting the inner casing to or removing of the inner casing from the outer casing.

The outer casing preferably has retaining means for retaining the inner casing. In this case, the retaining means reliably secures the inner casing to the outer casing. This prevents the inner casing from rattling by vibration caused when the vehicle is moving. This prevents the ability for purifying exhaust gas from decreasing.

The retaining means is preferably located apart from the downstream end surface of the filter by a predetermined distance and has a plurality of exhaust gas emitting holes. The open area rate is preferably within 20 to 60%. In this case, part of the retaining means except the exhaust gas emitting holes radiates the heat of the filter. Therefore, the temperature of the filter is increased, and some of particulates are burned by only the heat of exhaust gas.

The outer and inner casings are preferably located horizontally. In this case, as compared to a case when the filter is located facing diagonally upward, rain water is prevented from entering the filter. Thus, the filter is not adversely affected.

The inner casing preferably has holding means for holding the inner casing when attaching or detaching the inner casing to or from the outer casing. The holding means further facilitates attaching of the inner casing to and detaching of the inner casing from the outer casing. The holding means is preferably exposed outside the outer circumferential surface of the outer casing.

The holding means is preferably located at the downstream end of the inner casing. In the case the holding means is located at the downstream side of the inner casing where the temperature is low, the temperature of heat transmitted to the holding means is kept low as compared to a case where the holding means is located at the upstream side of the inner casing where the temperature is high.

The retaining means preferably includes a plate-like pressing member, which is located apart from the downstream end of the filter by 2 to 30 mm. In this case, the pressure loss is prevented from increasing and the heat of the filter is reliably radiated.

According to the modified embodiment of the present invention, a vehicle equipped with an exhaust gas purifier that removes particulates included in exhaust gas of an internal combustion engine is provided. In the vehicle according to the modified embodiment, the exhaust gas purifier is placed in an accommodating space for accommodating baggage or tools located in the vicinity of the internal combustion engine. In this case, an additional space is not required for placing the exhaust gas purifier in the vicinity of the internal combustion engine when mounting the exhaust gas purifier on the vehicle. Therefore, the exhaust gas purifier is easily mounted on an existing vehicle, which contributes to reducing the cost.

Another modified embodiment of the present invention provides an exhaust gas purifier for a bus that filters exhaust gas of an internal combustion engine mounted on a bus to collect particulates in the exhaust gas. The filter of the exhaust gas purifier is located in a trunk room of the bus and the downstream end of an exhaust gas passage, which extends from the internal combustion engine, is connected to the filter. Therefore, additional space is not required for placing the filter when retrofitting the filter onto an existing bus.

DETAILED DESCRIPTION OF THE PREFERRED EMBODIMENTS

An exhaust gas purifier according to a first embodiment of the present invention will now be described with reference to the attached drawings. The exhaust gas purifier is used in a vehicle, which is a bus in the first embodiment.

Figure 1:
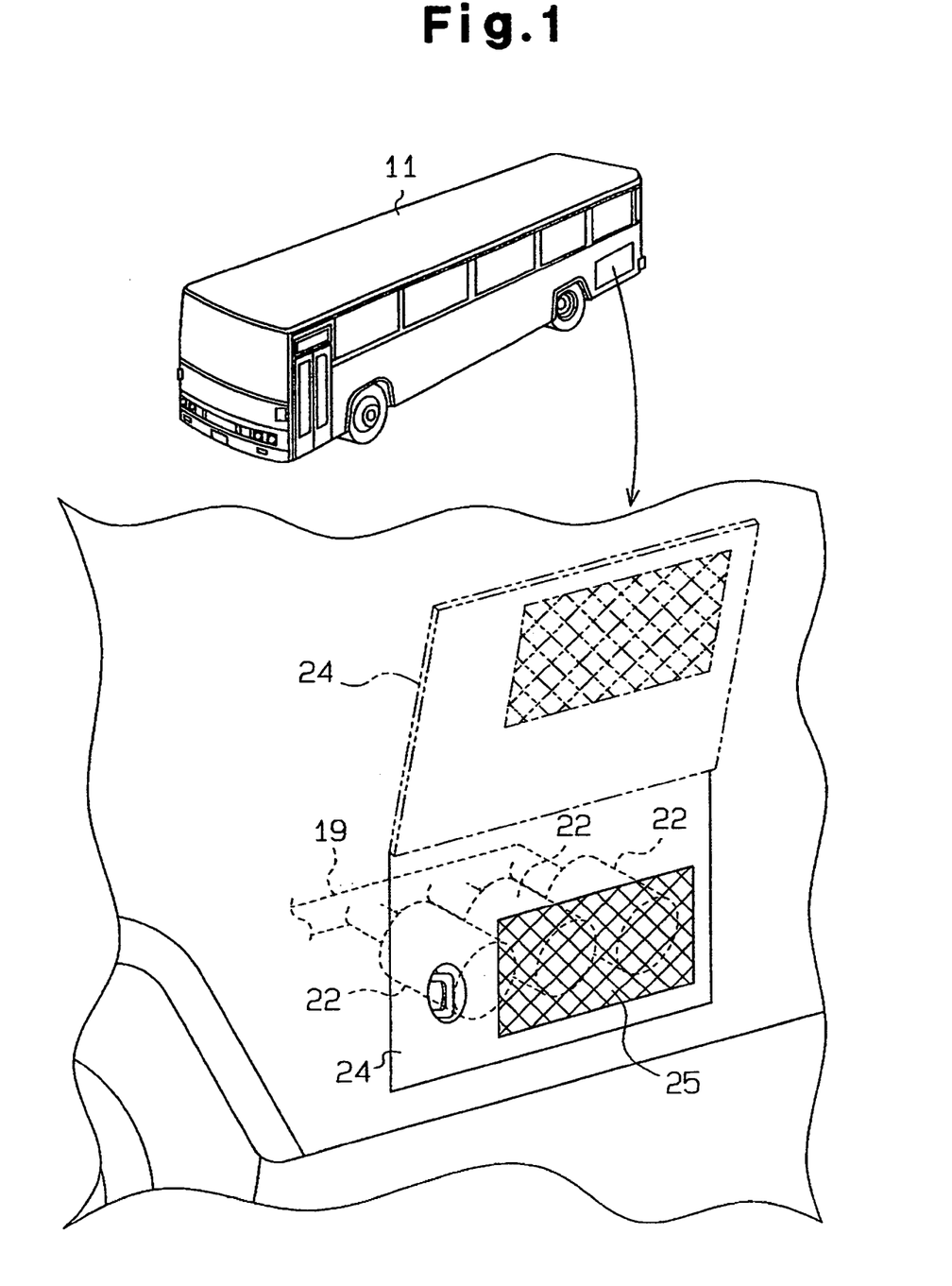
FIG. 1 is a diagram illustrating an exhaust gas purifier according to a first embodiment when the exhaust gas purifier is mounted on a bus.
Figure 2:
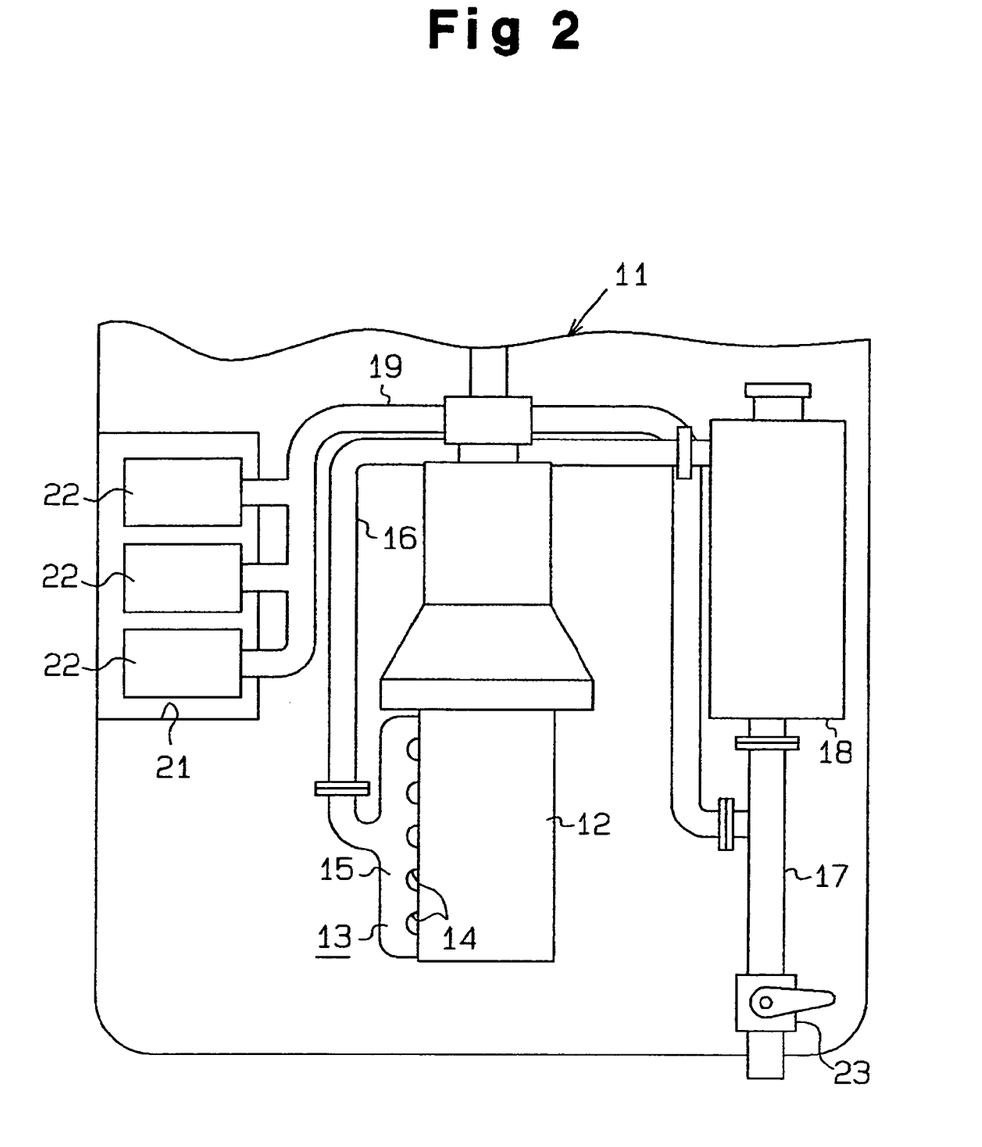
FIG. 2 is a schematic explanatory view illustrating a piping passage of an exhaust pipe.

As shown in FIGS. 1 and 2, a bus 11 has an internal combustion engine, which is a diesel engine 12 in this embodiment, on the rear side. The diesel engine 12 has cylinders, which are not shown. Each cylinder is coupled to one of branches 14 of an exhaust manifold 13. Each branch 14 is connected to a manifold main body 15. Therefore, exhaust gas emitted from each cylinder is concentrated at one place.

A first exhaust pipe 16 and a second exhaust pipe 17 are located downstream of the exhaust manifold 13. The upstream end of the first exhaust pipe 16 is coupled to the manifold main body 15. A muffler 18 is located between the first exhaust pipe 16 and the second exhaust pipe 17. The first exhaust pipe 16, the muffler 18, and the second exhaust pipe 17 are communicated with each other and exhaust gas flows through them.

An exhaust gas guiding pipe 19 is connected to the middle portion of the second exhaust pipe 17. The downstream end of the exhaust gas guiding pipe 19 is branched into three pipes. The branched pipes extend into an accommodating space, which is a trunk room 21 located in the vicinity of an engine room of the bus 11 in this embodiment. The trunk room 21 of the bus 11 is generally located in the vicinity of the engine room and accommodates baggage or tools.

Exhaust gas purifiers 22 (three in this embodiment) for purifying exhaust gas emitted from the diesel engine 12 are located inside the trunk room 21. In the first embodiment, the exhaust gas purifiers 22 and the exhaust gas guiding pipe 19 are retrofit onto the existing bus 11 that had no exhaust gas purifier 22.

When the exhaust gas purifiers 22 are retrofitted onto the bus 11, the exhaust gas outlet at the downstream end of the second exhaust pipe 17 is closed by a blocking member 23. The outlet is blocked to allow exhaust gas from the diesel engine 12 to pass through the first exhaust pipe 16, the muffler 18, the upstream portion of the second exhaust pipe 17, the exhaust gas guiding pipe 19, and the exhaust gas purifiers 22 before being released into the atmosphere. Therefore, in the first embodiment, the first exhaust pipe 16, the upstream portion of the second exhaust pipe 17, and the exhaust gas guiding pipe 19 form an exhaust gas passage.

As shown in FIG. 1, a side door 24 is located on one of the side surfaces of the bus 11 to selectively open and close the trunk room 21. An exhaust gas passing portion 25, which has a mesh structure, is located on part of the side door 24. Exhaust gas emitted from the exhaust gas purifiers 22 is emitted into the atmosphere through the exhaust gas passing portion 25.

Figure 3:
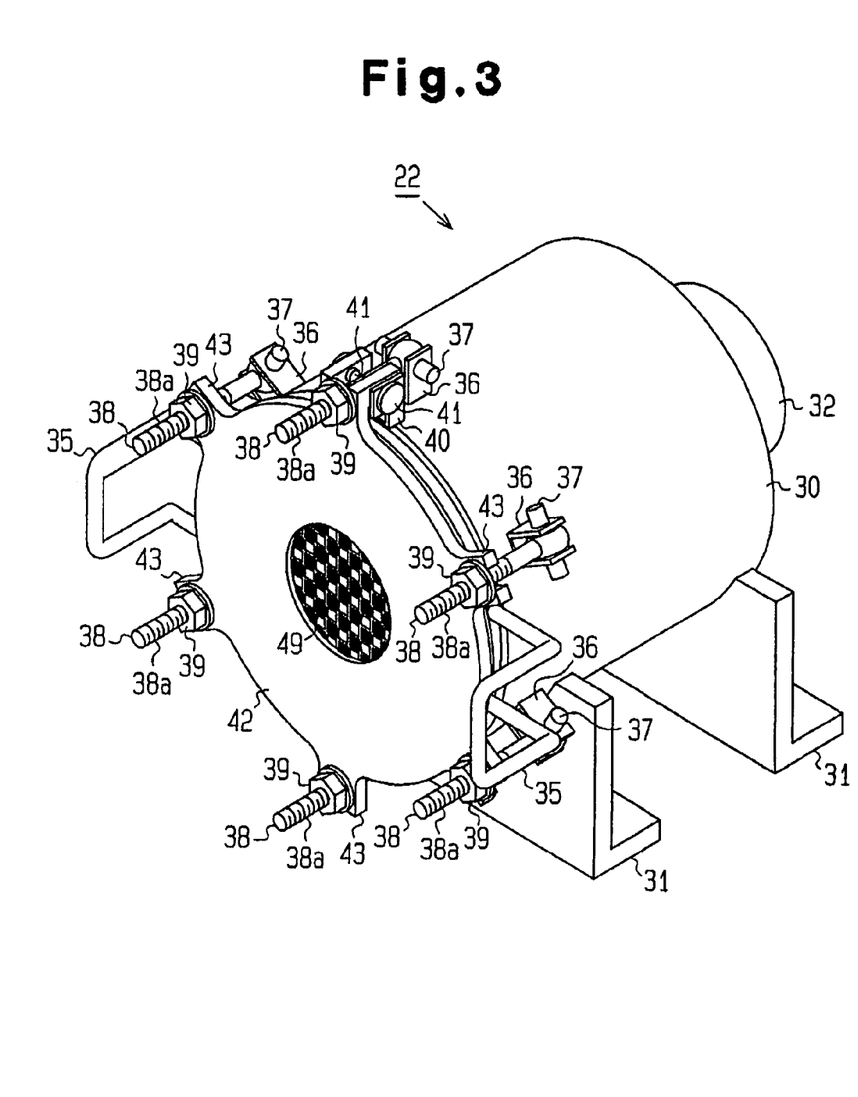
FIG. 3 is a perspective view illustrating the exhaust gas purifier.
Figure 4:
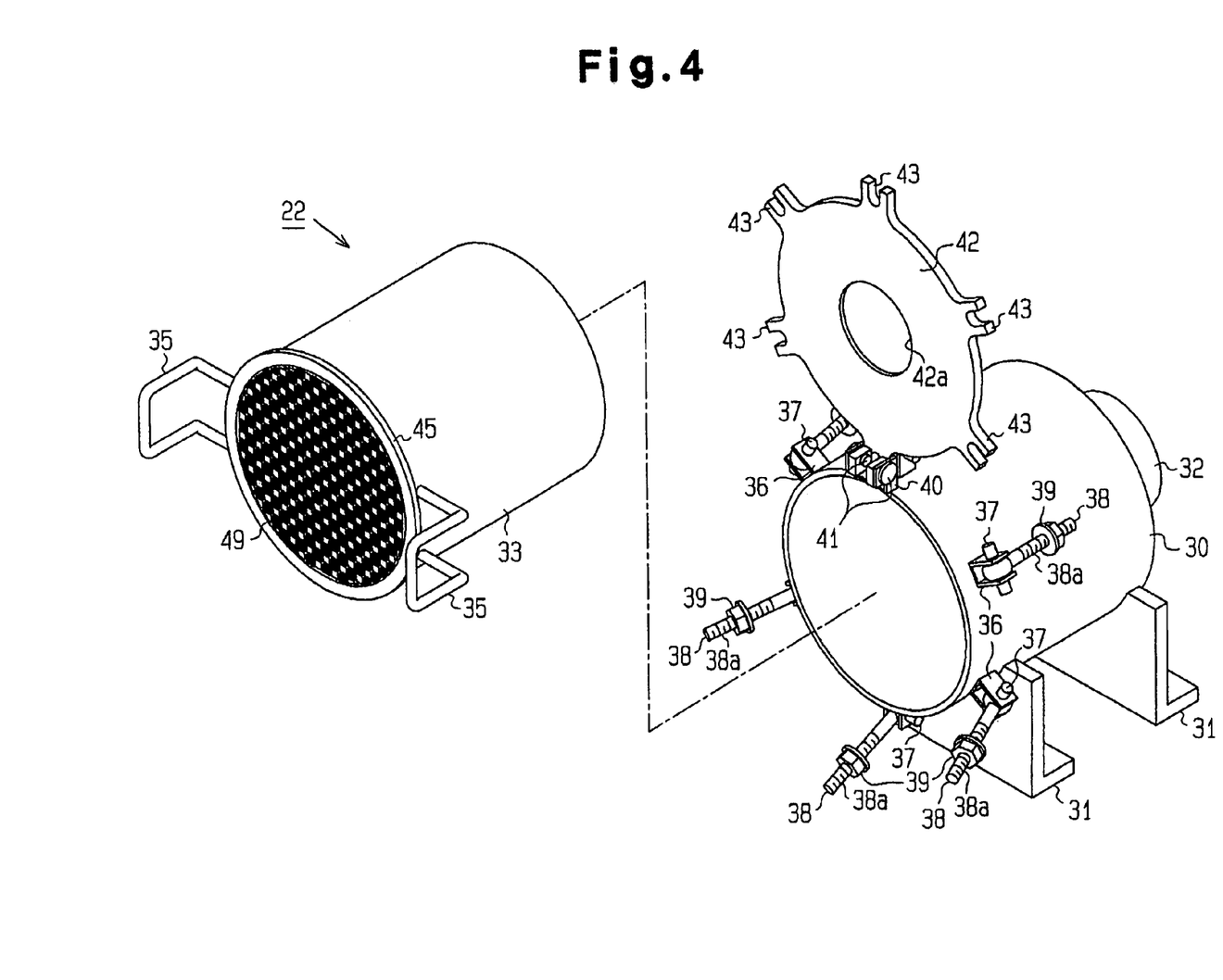
FIG. 4 is a perspective view illustrating the exhaust gas purifier with an inner casing removed.
Figure 5:
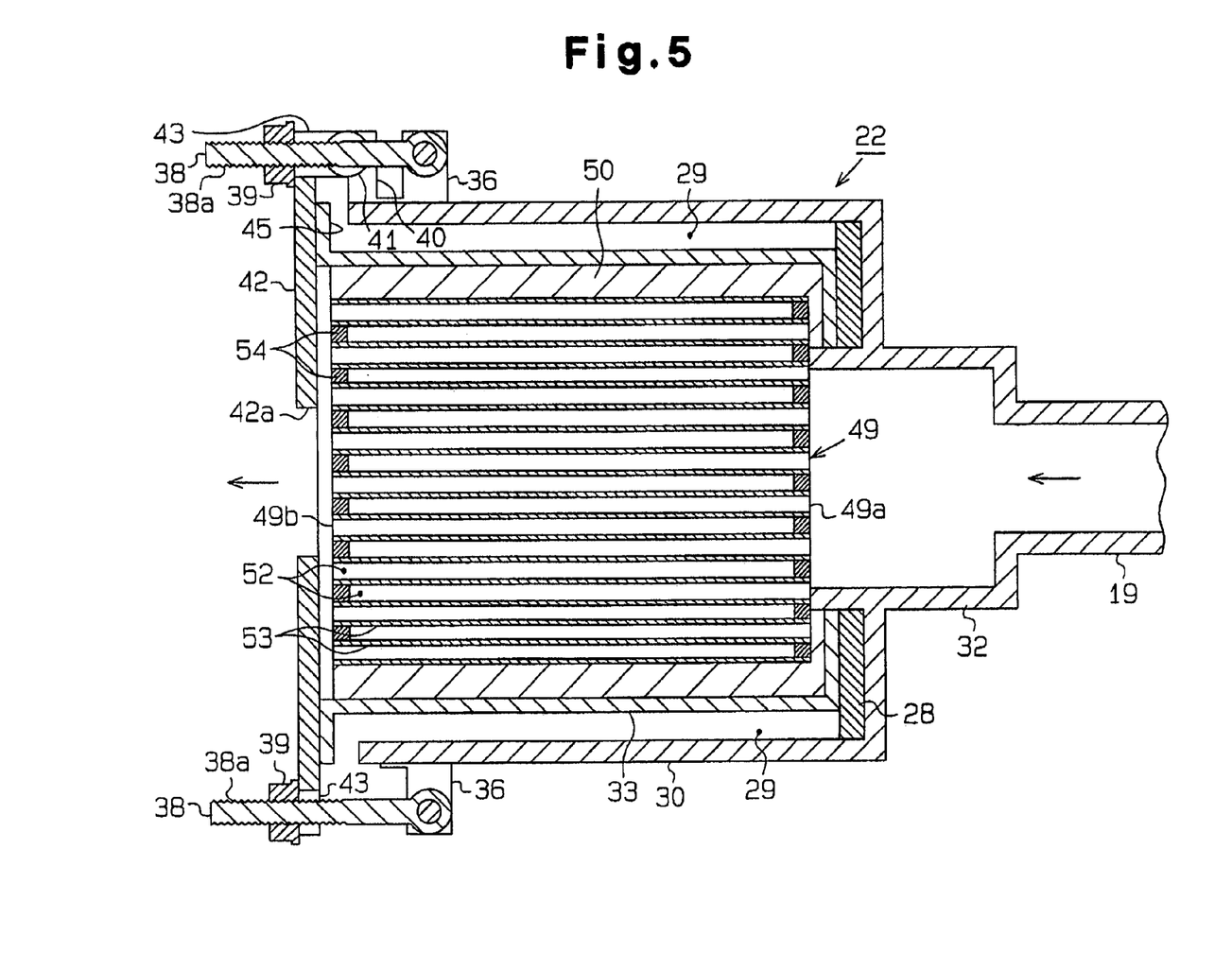
FIG. 5 is a cross-sectional view illustrating the exhaust gas purifier.

As shown in FIGS. 3 to 5, each exhaust gas purifier 22 has a cylindrical outer casing 30, which is placed at the bottom portion of the trunk room 21 with seats 31. An exhaust pipe connecting opening 32 is formed at the upstream portion of the outer casing 30. The downstream end of the exhaust gas guiding pipe 19 is connected to the exhaust pipe connecting opening 32. Exhaust gas is introduced into the outer casing 30 through the exhaust pipe connecting opening 32.

A cylindrical inner casing 33 is detachably located in the outer casing 30. The outer diameter of the inner casing 33 is smaller than the inner diameter of the outer casing 30. Therefore, when the inner casing 33 is inserted into the outer casing 30, a space 29 is formed between the inner and outer casings 30, 33. The space 29 prevents the heat of the inner casing 33 heated by exhaust gas from being transmitted to the outer casing 30.

The inner casing 33 is movable in the axial direction of the outer casing 30. The axial length of the inner casing 33 is slightly longer than the axial length of the outer casing 30. When accommodating the inner casing 33 in the outer casing 30, the outer end surface of the inner casing 33 abuts against a gasket 28, which is located in the outer casing 30 to prevent the inner casing 33 from being inserted any further.

Holding means, which is two handles 35, are located on the outer circumferential surface of the upstream end of the inner casing 33. The handles 35 are located opposite to each other in the radial direction of the inner casing 33. The handles 35 always project outward from the outer circumferential surface of the outer casing 30. The handles 35 project outside the outer casing 30 so that an operator can easily grasp the handles 35, and the handles 35 are efficiently cooled.

Several U-shaped bolt support members 36 (six in this embodiment) are located at the downstream end of the outer casing 30. The bolt support members 36 are arranged at equal intervals on the same circumference. A support shaft 37 is arranged on each bolt support member 36. The proximal end of a bolt 38 is rotatably supported by the support shaft 37. A tightening nut 39 is adjustably fitted to a threaded portion 38a formed at the distal end of each bolt 38.

A plate-like pressing member 42 for pressing the inner casing 33 is located at the downstream end of the outer casing 30. An exhaust gas emitting hole 42a is formed at the center of the pressing member 42. The pressing member 42 preferably has 20 to 60%, or more preferably, 30 to 70% of open area.

A shaft 41 is located on the outer circumferential surface of the outer casing 30 with a bearing 40. The peripheral portion of the pressing member 42 is rotatably supported by the shaft 41. Engaging recesses 43 (six in this embodiment) are formed on the periphery of the pressing member 42. Engaging recess 43 are arranged at positions corresponding to the bolts 38. Each engaging recess 43 engages with the corresponding bolt 38. The tightening nuts 39 are tightened while the engaging recesses 43 are engaged with the bolts 38. This presses the pressing member 42 against an annular flange 45, which projects from the outer circumference of the downstream end of the inner casing 33. Thus, in the first embodiment, the bolts 38, the tightening nuts 39, the pressing member 42, the engaging recesses 43, the annular flange 45 form retaining means for retaining the inner casing 33.

As shown in FIGS. 3 to 5, a filter 49 is accommodated in the inner casing 33. A heat insulation layer 50 is located between the outer circumferential surface of the filter 49 and the inner circumferential surface of the inner casing 33. The heat insulation layer 50 is a matted material, which includes ceramic fiber.

The honey comb filter 49 used in the first embodiment collects diesel particulates, such as soot, in exhaust gas. Therefore, the filter 49 is also called a diesel particulate filter (DPF). The filter 49 is made of sintered porous silicon carbide (SiC), which is a kind of sintered ceramics. Other than sintered silicon carbide, sintered ceramics such as silicon nitride, sialon, alumina, or cordierite may be selected. Also, the filter 49 may be made of metal instead of ceramics.

Through holes 52 having substantially square cross-section are regularly formed in the filter 49 extending along the axial direction of the filter 49. The through holes 52 are separated from each other by cell walls 53. Either of the opening portions of each through hole 52 is sealed by a sealing body 54 (sintered porous silicon carbide in this embodiment) on the end surface of the filter 49 such that the entire end surface of the filter 49 has a checkered pattern. As a result, several cells having rectangular cross-sections are formed in the filter 49. About half of the cells are open at the upstream end surface 49a and the remaining cells are open at the downstream end surface 49b.

Exhaust gas is supplied to the filter 49 from the upstream end surface 49a. Exhaust gas first flows into the cells that are open at the upstream end surface 49a. Exhaust gas then passes through the cell walls 53 and reaches the inner portions of the cells that are open at the downstream end surface 49b. Then, exhaust gas flows out from the downstream end surface 49b of the filter 49 through the opening of the cells. However, particulates, such as soot, in exhaust gas do not pass through the cell walls 53 and are caught by the cell walls 53. As a result, only the purified exhaust gas is emitted from the downstream end surface 49b of the filter 49. The purified exhaust gas is released into the atmosphere through the exhaust gas emitting hole 42a of the pressing member 42 and the exhaust gas passing portion 25.

A method for attaching and detaching the filter 49 located in each exhaust gas purifier 22 will now be described.

After opening the side door 24 of the bus 11, the tightening nuts 39 of each exhaust gas purifier 22 are loosened and all the engaging recesses 43 are disengaged from the bolts 38. After releasing the pressing member 42, the inner casing 33 is pulled outward along the axial direction of the outer casing 30 by grasping the handles 35. This removes the inner casing 33 from the outer casing 30.

After that, the inner casing 33 is attached to a filter purifier, which is not shown. The filter 49 is heated by an electric heater located in the filter purifier, which burns particulates adhered to the filter 49. This regenerates the filter 49. After the filter 49 is regenerated, the inner casing 33 is removed from the filter purifier and attached to the outer casing 30 in the reverse procedure. Thus, the filter 49 is attached to the exhaust gas purifier 22 again.

The first embodiment has the following advantages.

(1) The exhaust gas purifier 22 of the first embodiment includes the outer casing 30 and the inner casing 33, which accommodates the filter 49. The inner casing 33 axially moves in the outer casing 30. Therefore, the filter 49 is easily attached to or detached from the exhaust gas purifier 22 by inserting the inner casing to or removing the inner casing 33 from the outer casing 30. Particularly, the filter 49 used in a heavy route bus 11 needs to be regenerated frequently since a large amount of particulates accumulates. However, an operator regenerates the filter 49 without feeling troublesome.

(2) The filter 49 is located at the downstream end of the exhaust gas guiding pipe 19, that is, the lower most end of the exhaust gas passage. Therefore, it is not troublesome to retrofit the exhaust gas purifiers 22 onto the bus 11 that has no exhaust gas purifier 22 when the new bus 11 is delivered. Generally, to mount the exhaust gas purifier 22 at the middle of the exhaust gas passage, the exhaust gas purifier 22 needs to be secured to the exhaust passage at the upstream portion and the downstream portion. In the exhaust gas purifier 22 of the first embodiment, only the upstream portion is connected to the exhaust gas passage. This reduces the cost for retrofitting the exhaust gas purifiers 22 onto the existing bus 11.

(3) The filter 49 is located at the downstream end of the exhaust gas passage. Therefore, the downstream end surface 49b of the filter 49 is visually checked from the outside with the pressing member 42 being closed. Also, the amount of particulates collected by the filter 49 is reliably understood without removing the inner casing 33. Thus, a sensor for detecting the amount of particulates is omitted. This contributes to the cost reduction.

(4) The exhaust gas purifiers 22 are located in the trunk room 21. Therefore, it is easy to prepare a space for retrofitting the exhaust gas purifiers 22 onto the existing bus 11.

(5) There is the space 29 between the inner circumferential surface of the outer casing 30 and the outer circumferential surface of the inner casing 33. Therefore, although the inner casing 33 is heated as the bus 11 travels for a long period, the heat of the inner casing 33 is not easily transmitted to the outer casing 30. As a result, the bolts 38 and the tightening nuts 39 are not easily heated. Thus, the tightening nuts 39 are easily loosened when removing the inner casing 33, and the bolts 38 are easily removed from the engaging recesses 43 of the pressing member 42. That is, the working efficiency for removing the inner casing 33 is improved. Further, the threaded portion 38a of each bolt 38 is prevented from being melted by the heat. Thus, an expensive bolt 38 having heat resistance is not required, which prevents the manufacturing cost of the exhaust gas purifier 22 from increasing.

(6) The inner casing 33 is tightly secured to the outer casing 30 by tightening the bolts 38, which are engaged with the engaging recesses 43 of the pressing member 42, with the tightening nuts 39. Therefore, the filter 49 is prevented from being adversely affected by vibration caused when the bus 11 is moving. This prevents deterioration of the purifying ability of the filter 49.

(7) The filter 49 is located such that its axis extends horizontally. Therefore, as compared to a case when the filter 49 is facing diagonally upward, rain water rarely enters the inner casing 33.

(8) The inner casing 33 has the handles 35 for holding when moving the inner casing 33. Therefore, an operator holds the handles 35 to move the inner casing 33, and easily attach the inner casing 33 to or detach the inner casing 33 from the outer casing 30. Also, an operator easily carries the inner casing 33 to the filter purifier, which is not shown.

Figure 6:
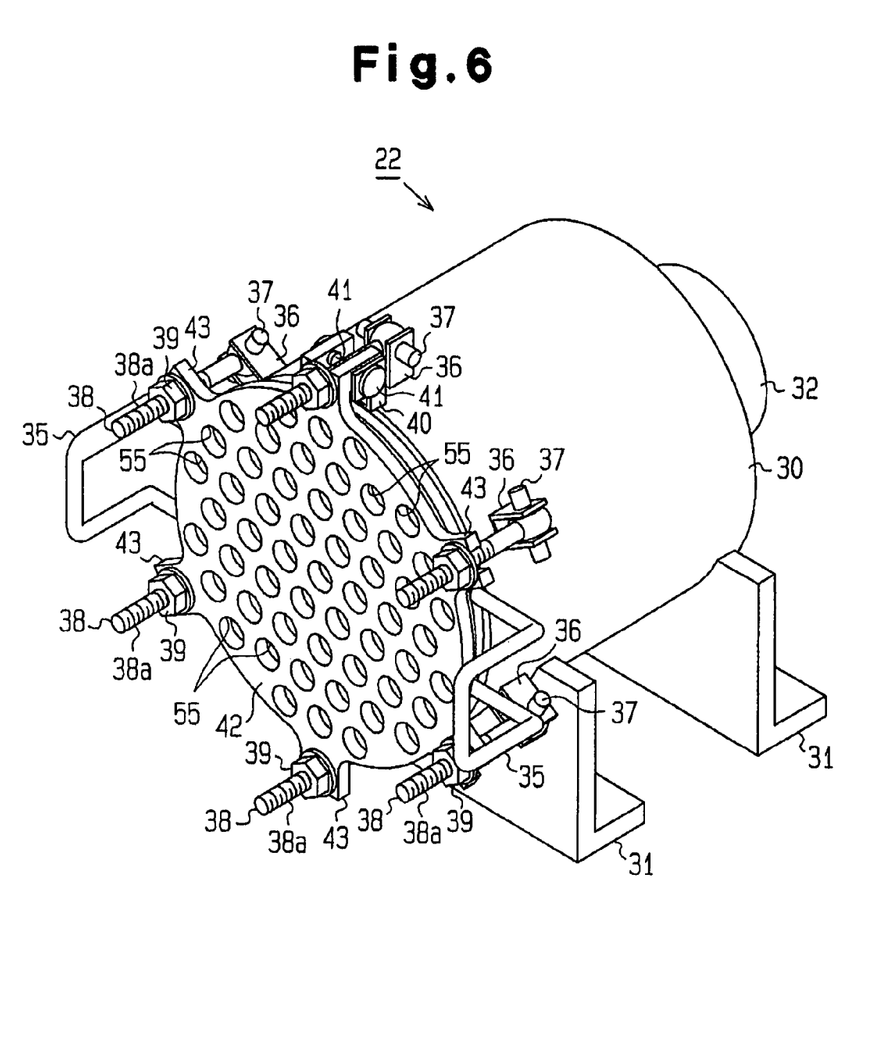
FIG. 6 is a perspective view illustrating an exhaust gas purifier according to a second embodiment.
Figure 7A:
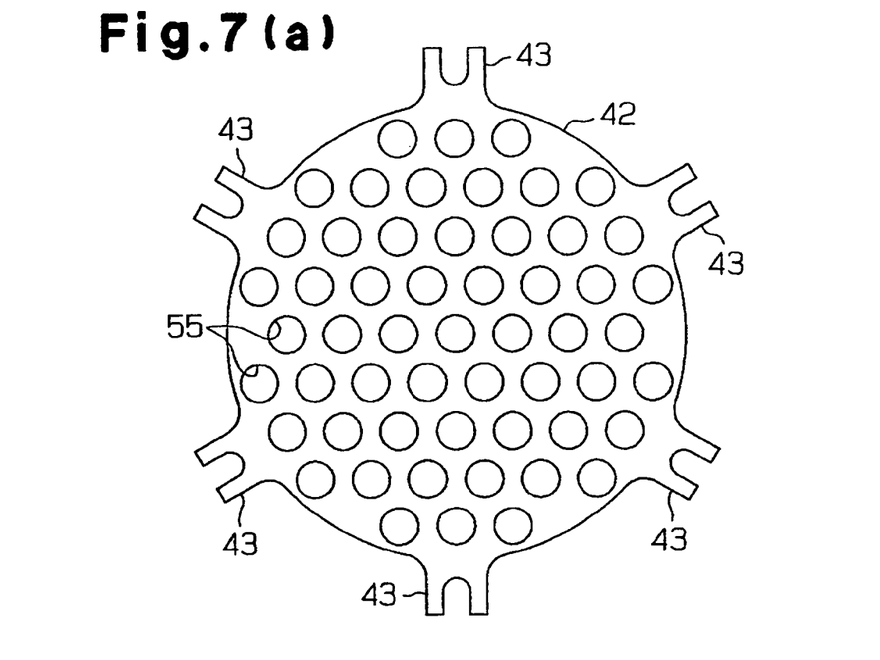
FIG. 7(a) is a front view illustrating a pressing member according to a first example.
Figure 7B:
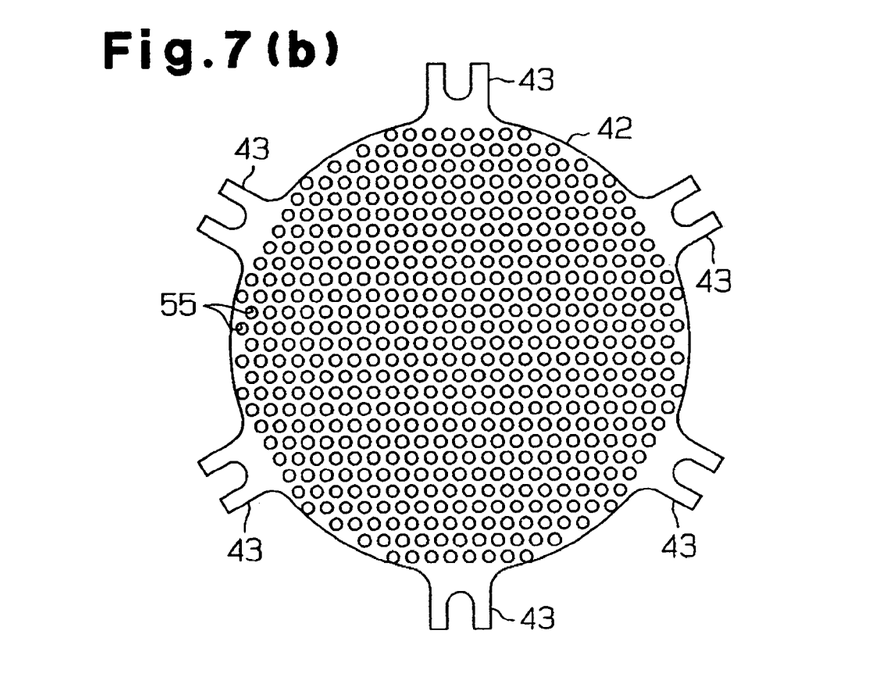
FIG. 7(b) is a front view illustrating a pressing member according to a second example.

In a second embodiment shown in FIG. 6, the pressing member 42 is constituted by a mesh member, which is a punching metal in the second embodiment, having several exhaust gas emitting holes 55. Each exhaust gas emitting hole 55 is circular and are scattered about the entire surface of the pressing member 42. In the second embodiment, the pressing member 42 preferably has 20 to 60%, or more preferably, 30 to 70% of an open area.

If the open area is less than 20%, exhaust gas that has passed through the filter 49 cannot easily go through the pressing member 42, which increases pressure loss. The pressure loss corresponds to a value obtained by subtracting the pressure value at the downstream of the filter from the pressure value at the upstream of the filter. The main cause of the pressure loss is the exhaust gas meeting a resistance when passing through the filter. When the pressure loss increases, the heat resistance, the mechanical strength, and the collecting efficiency of the filter 49 decreases, and the filter 49 becomes chemically unstable. On the other hand, if the open area of the pressing member 42 exceeds 60%, the radiation efficiency of heat and the reflection coefficient of infrared radiation decrease. This reduces the thermal insulation of the filter 49 and causes the strength of pressing member 42 to be easily decreased.

The diameter of each exhaust gas emitting hole 55 formed on the pressing member 42 is preferably 2 to 10 mm. If the diameter of each exhaust gas emitting hole 55 is less than 2 mm, exhaust gas is not smoothly emitted. Further, a large number of the exhaust gas emitting holes 55 need to be formed to maintain the above open area ratio, which increases manufacturing cost. On the other hand, if the diameter of each exhaust gas emitting hole 55 exceeds 10 mm, the strength of the pressing member 42 is not easily maintained, and reduces the radiation efficiency of heat and the reflection coefficient of infrared radiation of the filter 49.

The pressing member 42 is located downstream of the downstream end surface 49b of the filter 49 by a predetermined distance (see FIG. 5). In the second embodiment, the distance between the downstream end surface 49b of the filter 49 and the inner surface (the surface facing the filter 49) of the pressing member 42 is arranged within the range of 2 to 30 mm. The distance is more preferably set within the range of 5 to 15 mm. The reason for setting the distance between the filter 49 and the pressing member 42 as described above is as follows. If the distance is less than 2 mm, exhaust gas is not easily emitted and increases the pressure loss. On the other hand, if the distance exceeds 30 mm, the radiation efficiency of heat and the reflection coefficient of infrared radiation of the filter 49 decrease. This reduces the thermal insulation of the filter 49.

The pressing member 42 is preferably made of metal. This is because the pressing member 42 needs to have heat resistance so that the pressing member 42 does not deform by heat. The pressing member 42 preferably has the radiation efficiency of 0.5% or more at 400 to 700 degrees. If the radiation efficiency is less than 0.5%, the amount of heat radiated from the pressing member 42 is small.

The thickness of the pressing member is preferably 1.0 to 5.0 mm. If the thickness of the pressing member 42 is less than 1.0 mm, the strength of the pressing member 42 decreases. On the other hand, if the thickness of the pressing member 42 exceeds 5 mm, heat of the filter 49 is easily absorbed. Therefore, the radiation effect of the heat of the filter 49 is reduced, and the weight of the exhaust gas purifier 22 is increased. Thus, the exhaust gas purifier 22 is not easily mounted on the bus.

Examples and comparative examples of the exhaust gas purifier will now be described.

FIRST EXAMPLE

After adding and mixing organic binder, water, and the like to silicon carbide powder, an extrusion molding is performed to obtain a molded body, which is a rectangular solid. The molded body is then dried, degreased, and baked. Then, several molded bodies are adhered to one another by an adhesive. The adhered molded bodies are then cut by a diamond cutter to make the columnar filter 49. Then, the filter 49, which is formed of sintered silicon carbide having the air holes, the average diameter of which is 5 to 20 µm, the cells, the number of which is 31/cm$^2$, and the partition walls, the thickness of which is 0.3 mm, is manufactured.

Also, a ready-made stainless punching metal is used as the material of the pressing member 42 and punched by a press to obtain the pressing member 42 having the above mentioned shape. The diameters of the exhaust gas emitting holes 55 formed in the pressing member 42 are 8.0 mm and the opening pitch is 12 mm. Therefore, the open area ratio is set to 41.9%. Further, the thickness of the pressing member 42 is set to 2 mm, the diameter of the pressing member is set to 173.8 mm, and the radiation efficiency is set to 0.9 at 400 to 700 degrees centigrade. Such pressing member 42 is located apart from the downstream end surface 49b of the filter 49 by 5 mm.

An experiment for collecting particulates was conducted for three hours with the rotation number of the diesel engine 12 set to 1500 rpm and the torque set to 20N·m. As a result, the heat of exhaust gas was radiated and the temperature of the filter 49 was increased. This burned the particulates collected by the filter 49. That is, the collected particulates were burned by spontaneous ignition to regenerate the filter 49. In this case, the regeneration rate was 80%. The sound pressure was also measured at a position apart from the pressing member 42 by 1 m. The result was 52 dB.

SECOND EXAMPLE

The diameters of the exhaust gas emitting holes 55 formed in the stainless pressing member 42 are set to 2.5 mm and the open area pitch is set to 4 mm. Thus, the open area rate of the pressing member is set to 35.0%. Further, the thickness of the pressing member 42 is set to 1 mm, the diameter is set to 173.8 mm, and the radiation efficiency is set to 0.95 at 400 to 700 degrees centigrade. The pressing member 42 is located apart from the downstream end surface 49b of the filter 49 by 10 mm.

An experiment for collecting particulates was conducted on the above exhaust gas purifier 22 under the same condition as the first example. As a result, the heat of exhaust gas was radiated and the temperature of the filter 49 was increased. This burned the particulates collected by the filter 49. That is, in the second example also, the collected particulates were burned by spontaneous ignition and the filter 49 was regenerated. In this case, the regeneration rate was 86%. The sound pressure was measured under the same condition as the first example and the result was 50 dB.

THIRD EXAMPLE

The pressing member 42 of the third example has one large exhaust gas emitting hole 55. The diameter of the exhaust gas emitting hole 55 is 130 mm. The open area rate of the pressing member 42 is set to 95.0%. An experiment for collecting particulates was conducted on such exhaust gas purifier under the same condition as the first example. As a result, the heat of the exhaust gas was not radiated and the temperature of the filter 49 did not increase as compared to the first and second examples. In the third example, collected particles hardly burned by spontaneous ignition and the regeneration rate was 21%. Also, the sound pressure was measured under the same condition as the above examples and the result was 60 dB.

FIRST, SECOND, AND THIRD COMPARATIVE EXAMPLES

In first to third comparative examples, the inner casing was secured to the outer casing and an exhaust gas purifier having no space between the casings was prepared. Then, in each comparative example, an experiment for collecting particulates was conducted under the same condition as the corresponding example. The results are shown in the following table together with the results of the first to third examples.

TABLE

| | Space | Open Area Rate (%) | Irradiation Efficiency | Regeneration Rate (%) | Sound Pressure (dB) |
|---|---|---|---|---|---|
| First Example | Present | 41.9 | 0.9 | 80 | 52 |
| Second Example | Present | 35 | 0.95 | 86 | 50 |
| Third Example | Present | 95 | 0 | 21 | 60 |
| First Comparative Example | Absent | 41.9 | 0.9 | 75 | 55 |
| Second Comparative Example | Absent | 35 | 0.95 | 80 | 51 |
| Third Comparative Example | Absent | 95 | 0 | 18 | 60.5 |

As shown in the table, the filter 49 according to each example has higher regeneration rate as compared to that of the corresponding comparative example. Also, the sound pressure level of each example is lower than that of the corresponding comparative example. Since the diesel engine 12 is driven under the same condition, the sound pressure level of each example and the corresponding comparative example are the same. However, the sound pressure level between each example and the corresponding comparative example differs. This is because the exhaust sound of the exhaust gas in each example is lower than that of the corresponding comparative example.

The second embodiment provides the following advantages.

(1) The pressing member 42 has several exhaust gas emitting holes 55. Therefore, the open area rate of the pressing member is 20 to 60%. Also, the pressing member 42 is located apart from the downstream end surface 49b of the filter 49 by 2 to 30 mm. Thus, the heat of the filter 49 is easily radiated by the pressing member 42 and the temperature of the filter 49 is increased. This allows a certain amount of particulates to burn by only the heat of the exhaust gas. As a result, the exhaust gas purifier 22 is used for a longer period before the filter 49 needs to be regenerated by the electric heater located separate from the exhaust gas purifier 22. This eliminates a troublesome procedure to frequently remove the filter 49 from the outer casing 30 to regenerate the filter 49.

(2) The pressing member 42 is constituted by the punching metal, which reduces the exhaust sound of exhaust gas. This reduces traveling sound of the bus.

The embodiments of the present invention may be modified as follows.

In the above embodiments, a number of exhaust gas purifiers 22 are provided. The number of the exhaust gas purifier 22 may be changed in accordance with the exhaust amount of the bus.

The distal end of the bolts 38 may be crushed or the distal end portion of the threaded portion of the bolts 38 may be damaged. With this structure, the tightening nuts 39 are prevented from falling off the bolts 38 in case they are loosened when the bus 11 is traveling.

In the above embodiments, the exhaust gas purifier 22 is retrofitted onto the heavy route bus 11. However, the exhaust gas purifier 22 may be mounted on the bus 11 when the bus 11 is manufactured. Also, the exhaust gas purifier 22 may be mounted on fire trucks, ambulances, trucks, or ordinary vehicles that are equipped with the diesel engine 12.

The handles 35 may be coated with a coating member that has low coefficient of thermal conductivity. With this structure, the surface temperature of the handles 35 is kept low when the inner casing 33 has high temperature immediately after stopping the engine. Therefore, the filter 49 is more easily attached or detached.

In the above embodiments, the exhaust gas purifier 22 is located at the downstream end of the exhaust gas passage. However, the exhaust gas purifier 22 may be located at the middle of the exhaust gas passage. In this case, a flexible exhaust pipe is preferably connected to the pressing member 42 such that the flexible exhaust pipe is selectively attached and detached. In this case, the inner casing 33 is removed from the outer casing 30 by opening the pressing member 42 after removing the flexible exhaust pipe from the pressing member 42.

In the above embodiments, the filter 49 is located horizontally and such that the axis of the filter 49 is perpendicular to the side door 24 of the bus 11. However, the outer casing 30 may be inclined such that the filter 49 faces diagonally upward or diagonally downward. When the filter 49 is located facing diagonally upward, working performance is further improved when attaching or detaching the inner casing 33 to or from the outer casing 30.

A third casing may be located between the outer casing 30 and the inner casing 33 such that a space is formed between the outer casing 30 and the third casing, and between the third casing and the inner casing 33. With this structure, the third casing further prevents heat of the inner casing 33 from being transmitted to the outer casing 30.

In the above embodiments, the inner surface (the surface facing the filter 49) of the pressing member 42 may be mirror finished. In this case, the infrared radiation and the like is reliably reflected. Further, the inner surface of the pressing member 42 may be roughened. In this case, the heat transfer area of the pressing member 42 is increased, which improves radiation efficiency.

Figure 8:
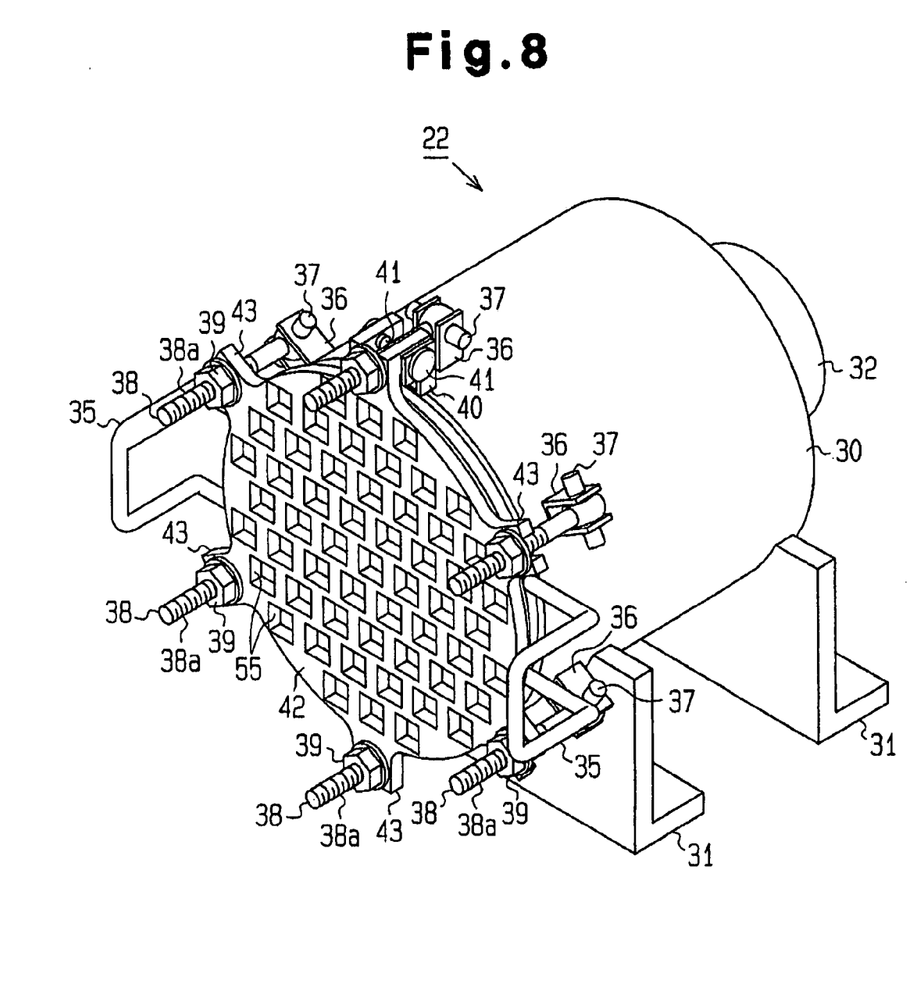
FIG. 8 is a perspective view illustrating an exhaust gas purifier according to a modified embodiment.

According to a modified embodiment of the second embodiment, the shape of the exhaust gas emitting holes 55 formed in the pressing member 42 may be changed as long as the open area ratio of the pressing member 42 is within the above mentioned range. For example, as shown in FIG. 8, the shape of the exhaust gas emitting holes 55 may be square.

As shown in FIG. 10(*a*), pentagonal and quadrangle exhaust gas emitting holes 55 may be mixed. As shown in FIG. 10(*b*), the exhaust gas emitting holes 55 may have scale structure. As shown in FIG. 10(*c*), cruciform and circular exhaust gas emitting holes 55 may be mixed. As shown in FIGS. 10(*e*) and 10(*f*), the exhaust gas emitting holes 55 may be elongated holes. Particularly, in the example of FIG. 10(*e*), the exhaust gas emitting holes 55 are located in zigzag. On the other hand, in the example of FIG. 10(*f*), the exhaust gas emitting holes 55 are located in line parallel to each other. In addition, as shown in FIG. 10(*g*), exhaust gas emitting holes 55 may have diamond shapes.

Figure 9:
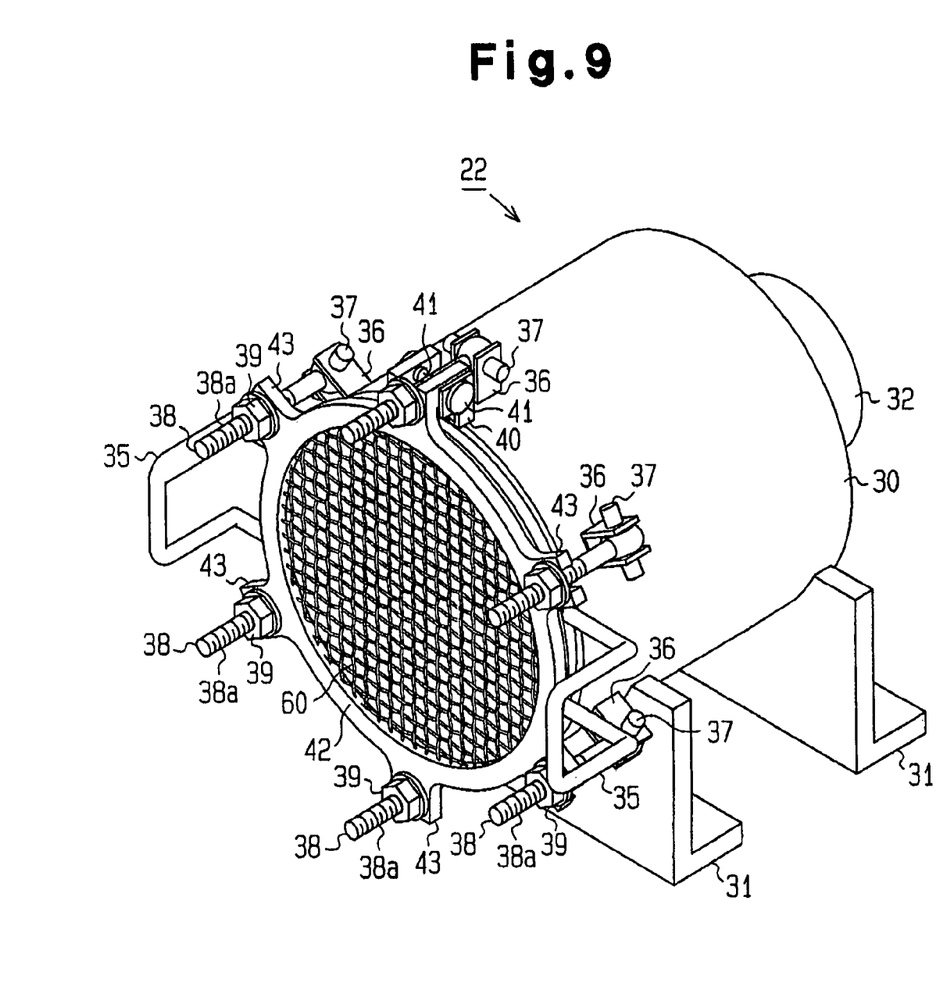
FIG. 9 is a perspective view illustrating an exhaust gas purifier that uses a pressing member, which is different from the pressing member shown in FIG. 8.
Figure 10A:
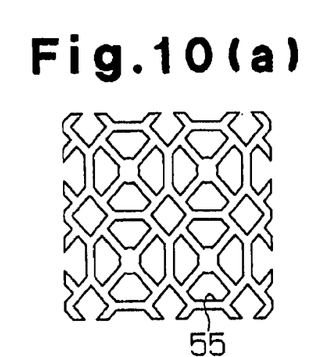
FIGS. 10(a) to 10(g) are views illustrating punching metals having different shapes of exhaust gas emitting holes.
Figure 10B:
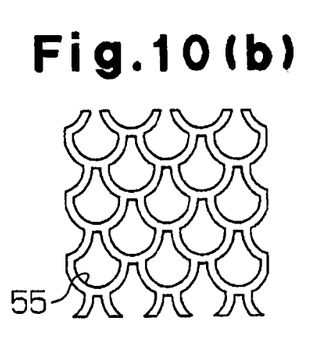
Figure 10C:
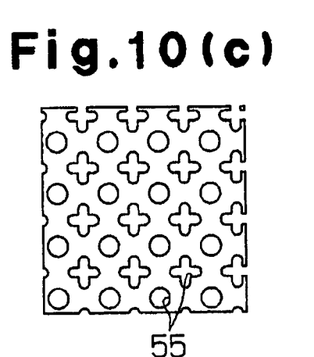
Figure 10D:
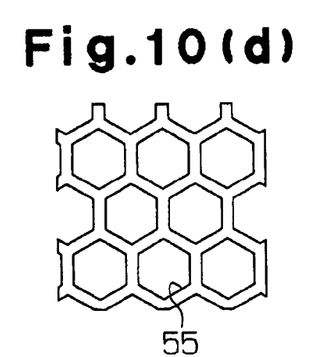
Figure 10E:
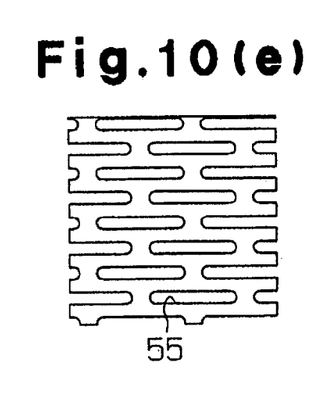
Figure 10F:
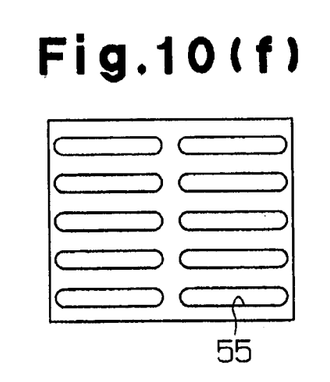
Figure 10G:
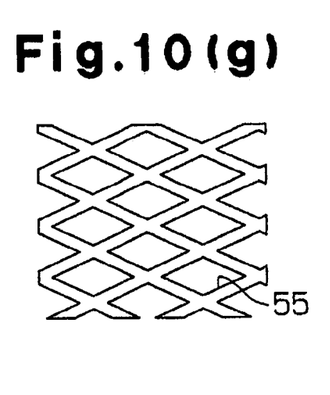

According to another modified embodiment of the second embodiment, most part of the pressing member 42 may be open and a mesh material 60 may be located at the opening portion as shown in FIG. 9.

In the second embodiment, the pressing member 42 is formed by a stainless punching metal. However, the pressing member 42 may be formed by metal material such as titanium, aluminum, and the like.

The invention claimed is:

1. An exhaust gas purifier that filters exhaust gas from an internal combustion engine to collect particulates in the exhaust gas, the exhaust gas purifier comprising:

an outer casing and an inner casing, which is located inside the outer casing and accommodates, wherein the inner casing is selectively attached to and detached from the outer casing; and retaining means for retaining the inner casing to the outer casing, wherein the retaining means is located apart from a downstream end surface of the filter by a predetermined distance, and has at least one of exhaust gas emitting hole, wherein the open area rate of the gas emitting hole to the retaining means is set to 20 to 60%, and wherein the retaining means retains the inner casing in the outer casing when the retaining means is integrally connected to the outer casing from downstream of the filter, and the inner casing is detachable from the outer casing when the retaining means is detached from the outer casing.

2. The exhaust gas purifier according to claim 1, wherein the outer casing is connected to the downstream end of an exhaust gas passage, which extends from the internal combustion engine.

3. The exhaust gas purifier according to claim 1, wherein a space is formed between the outer casing and the inner casing.

4. The exhaust gas purifier according to claim 1, wherein the outer and inner casings are cylindrical, wherein the outer casing has an opening portion at the downstream end, and the inner casing moves along the axial direction of the outer casing, and wherein the inner casing is selectively inserted in and removed from the outer casing via the opening portion.

5. The exhaust gas purifier according to claim 1, wherein the outer and inner casings are located horizontally.

6. The exhaust gas purifier according to claim 1, wherein the retaining means includes a plate-like pressing member, wherein the pressing member is located apart from the downstream end surface of the filter by 2 to 30 mm.

7. A vehicle having an exhaust purifier for removing particulates included in exhaust gas of an internal combustion engine, wherein the vehicle has the exhaust gas purifier according to claim 1 in an accommodating space for accommodating baggage and tools located in the vicinity of the internal combustion engine.

8. The exhaust gas purifier according to claim 1 wherein the exhaust gas purifier is used for a bus and is located in a trunk room of the bus and connected to the lower end of an exhaust gas passage, which extends from the internal combustion engine.

9. The exhaust gas purifier according to claim 1, wherein the filter is a honey comb filter and has a plurality of through holes regularly formed therein extending along the axial direction thereof.

10. The exhaust gas purifier according to claim 1, wherein the purified exhaust gas is released into the atmosphere through the exhaust gas emitting holes.

11. The exhaust gas purifier according to claim 1, wherein the inner casing has handles for holding the inner casing when selectively attaching the inner casing to the detaching the inner casing from the outer casing.

12. The exhaust gas purifier according to claim 11, wherein the handles are exposed outside from an outer circumferential surface of the outer casing.

13. The exhaust gas purifier according to claim 8, wherein the handles are located at the downstream end of the inner casing.

* * * * *

UNITED STATES PATENT AND TRADEMARK OFFICE
CERTIFICATE OF CORRECTION

PATENT NO. : 7,234,296 B2 Page 1 of 1
APPLICATION NO. : 10/296027
DATED : June 26, 2007
INVENTOR(S) : Masaaki Kojima It is certified that error appears in the above-identified patent and that said Letters Patent is hereby corrected as shown below:

Title Page
Item (54), Title
Change "EXHAUST GAS CLEANUP APPARATUS" to read -- EXHAUST GAS PURIFIER --

Signed and Sealed this

Sixth Day of November, 2007

JON W. DUDAS
*Director of the United States Patent and Trademark Office*